United States Patent [19]

Devitt et al.

[11] 4,338,978
[45] Jul. 13, 1982

[54] LEAD CHLORIDE BATTERY PLATE

[75] Inventors: John L. Devitt, Denver; Douglas E. Johnson, Grand Junction; Robert S. Willard, Denver, all of Colo.

[73] Assignee: Sparton Corporation, Jackson, Mich.

[21] Appl. No.: 201,581

[22] Filed: Oct. 28, 1980

Related U.S. Application Data

[62] Division of Ser. No. 131,027, Mar. 17, 1980, Pat. No. 4,262,069.

[51] Int. Cl.³ .............................................. H01M 4/82
[52] U.S. Cl. .................................... 141/1.1; 29/623.5; 141/32
[58] Field of Search ....................... 29/2, 623.5, 623.1; 141/1.1, 32, 33; 429/225–228, 119

[56] References Cited

U.S. PATENT DOCUMENTS

| | | | |
|---|---|---|---|
| 3,468,710 | 2/1966 | Krasnow et al. | 136/26 |
| 3,943,004 | 3/1976 | Honer et al. | 136/100 |
| 3,953,238 | 4/1976 | Honer | 136/90 |
| 3,966,497 | 6/1976 | Honer | 136/90 |
| 4,021,597 | 5/1977 | Burant | 429/119 |

*Primary Examiner*—Frederick R. Schmidt
*Attorney, Agent, or Firm*—Beaman & Beaman

[57] ABSTRACT

A seawater activated battery plate, and a method of making the same, utilizing an electrically conducting grid and an active reducible material primarily constituting lead chloride adhering to the grid such that the grid is exposed at a surface of the active material, the material adjacent the grid primarily constituting porous lead and a metal chloride. The battery plate is characterized by its inexpensive method of manufacture, its quick activation even in cold seawater, its absence of significant voltage peaking at initial discharge and uniform voltage generation during discharge.

3 Claims, 3 Drawing Figures

LEAD CHLORIDE BATTERY PLATE

This is a divisional application of application Ser. No. 131,027 filed Mar. 17, 1980, now U.S. Pat. No. 4,262,069.

SUMMARY OF THE INVENTION

The invention pertains to a method of forming seawater activated battery positive plates utilizing lead chloride as a primary constituent in the active material wherein a lead chloride composition is affixed to a metallic grid.

Batteries utilizing seawater as the electrolyte are widely used in submarine detection apparatus, such as sonobuoys, and such batteries must be inexpensive, concise, capable of rapid activiation upon contact with seawater, and produce uniform voltage output with a minimum of initial peaking and terminal voltage drop. A wide variety of battery positive plate constructions have been utilized in seawater batteries, and it has been previously proposed that such battery plates utilize lead chloride in the active material such as described in U.S. Pat. Nos. 3,468,710; 3,943,004; 3,953,238; 3,966,497 and 4,021,597. Also, it has been proposed in U.S. Pat. Nos. 3,943,004 and 4,021,597 to utilize sheets or grids in conjunction with the lead chloride active material. However, such previous prior art battery plates are unduly expensive, mechanically weak, slow to activate in cold seawater, such as 0° centigrade, and such prior art battery plates are not capable of producing uniform voltages during operation in that peak voltages occur at the beginning of discharge and the voltage progressively declines during discharge. Also, prior art batteries produce significant voltage output variations depending upon the temperature of the activating seawater.

It is an object of the invention to provide a method of forming lead chloride battery positive plate adapted to be activated by seawater wherein the method of manufacture is relatively simple and inexpensive, and permits the plate to be readily produced by high production techniques.

An additional object of the invention is to provide a method of forming battery positive plate construction wherein the active material of the plates is relatively porous, plastic bonded, flexible, durable and is mechanically stable having been pressed upon an electrically conducting grid.

A battery plate formed in accord with the method of the invention comprises a plate utilizing a mesh of electrically conductive material, such as copper, in which an active lead chloride material is pressed wherein a surface of the reducible material is coincident with an exposed surface of the grid, exposing both the grid and the active material to the electrolyte, such as seawater. The active material adjacent the exposed grid surface is converted to a porous lead and metal chloride achieving high electrical conductivity, and the battery plate is of a high mechanical strength and stability.

Battery plates in accord with the invention are formed by spreading a paste made of lead chloride powder and resinous polymer binder upon the grid in such a manner that the mesh remains exposed, or visible, and the paste is permitted to dry. After drying, a mixture of zinc powder and water is applied to the grid and adjacent lead chloride surface converting the surface of the lead chloride adjacent the grid to metallic lead of a porous nature and zinc chloride. The plate is preferably pressed shortly before becoming completely dry to increase the mechanical strength.

BRIEF DESCRIPTION OF THE DRAWINGS

The aforementioned objects and advantages of the invention will be appreciated from the following description and the accompanying drawing wherein.

DESCRIPTION OF THE PREFERRED EMBODIMENT

Figure 2:
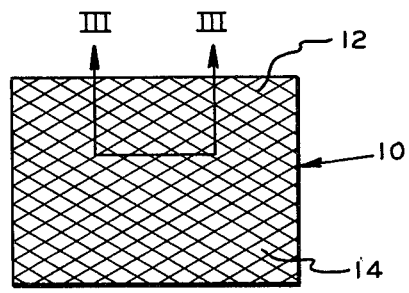
FIG. 2 is a plan view of a battery plate of the invention.
Figure 3:
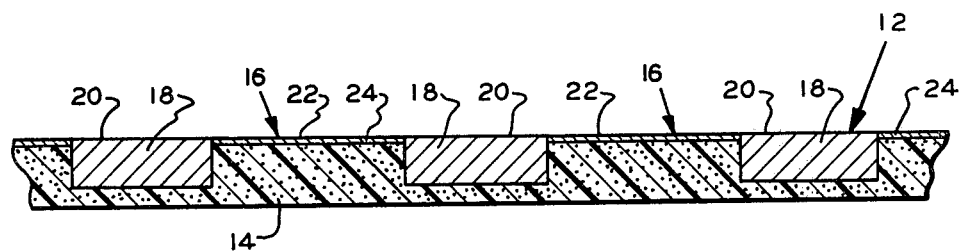
FIG. 3 is an enlarged, detail, elevational, sectional view of the battery plate as taken along Section III—III of FIG. 2.

The structure of a battery positive plate formed in accord with the method of the invention is best appreciated from FIGS. 2 and 3. The plates are usually of a rectangular configuration, and are thin, usually being of a thickness approximately 1 millimeter.

The plate 10 comprises an electrically conductive grid or mesh 12 which may be formed of expanded metal, and is usually copper. However, it will be appreciated that the grid 12 may be formed of other electrically conductive metals, and the grid may include relatively large openings 16 for receiving the active material generally indicated at 14. One of the features of the invention lies in the fact that it is not necessary to use a fine mesh grid as is usually required in seawater batteries using lead chloride materials.

The active material 14 basically comprises a resin-bonded lead chloride composition, and this material has been pressed into the openings 16 of the grid so as to completely fill the same as will be apparent from FIG. 3. The thickness of the material 14, as represented by the vertical dimension of the material 14 in FIG. 3 within an opening 16, may be slightly greater than the thickness of the grid sections 18, or may be substantially equal thereto. In FIG. 3 the thickness of the material 14 is slightly greater than that of the grid.

The grid sections 18 include a surface 20, and the material 14 includes a surface 22 which is essentially coincident with the grid surface 20. Thus, the grid surface 20 will be exposed, and is not embedded within the material 14 as is often the case in seawater battery constructions.

The material 14, after being located within the grid openings 16, is reduced at surface 22 by a zinc powder mixture wherein a layer of porous lead metal and zinc chloride, represented at 24, is defined at the surface 22. The presence of this porous lead layer augments the electrical characteristics of the plate, and this layer may be readily formed as explained below.

Electrical conductors, not shown, are connected to the grid 12. The plate 12 is used in conjunction with a plurality of similar plates connected in bi-polar configuration with anodes in the known manner to form a battery. Such a battery basically consists of a chamber receiving seawater, the bi-polar cells positioned within the chamber and connected electrically in series relationship. The battery anodes may consist of sheets of magnesium or aluminum alloy. Separators, terminals and other conventional battery components are used. In sonobuoy use, the chamber in which the plates 10 are located receive seawater upon the sonobuoy unit being submerged in the seawater body being sounded, and the means for introducing seawater into the battery, or the control of seawater movement, is well known in the art and forms no part of the present invention.

The active material 14 preferably consists of a lead chloride powder, approximately 90–99.5%, and preferably 97%, by weight, and the remainder a binder such as a thermoplastic acrylic polymer emulsion, approximately 3% by weight. These ingredients are mixed with water to form a spreadable paste.

The above described lead chloride paste is applied in a uniform thickness to the copper grid in such a manner that the grid surface 18 is coincident with the material surface 22, and the assembly is then partially dried at a temperature compatible with the ingredients, particularly the thermoplastic ingredients. At this time the grid may consist of an elongated member of the desired width being dispensed from a roll.

The coincident relationship of the grid surface 20 and the material surface 22 is accomplished by a wiper or a roll, and prior to the paste being completely dry, the assembly may be pressed by rolling to increase the density of the material, and assure a uniform density consistency. Such pressing improves the mechanical strength and toughness of the assembly.

The grid and material 14 surfaces 20 and 22 are now treated with a conversion reduction mix. This reduction mix is preferably approximately 10–50% by weight zinc powder in water and is applied in a dry or wet form using common spraying or roller coating methods. Clay may be added to assist suspension of the zinc. The mixture is applied in a uniform thin coating to the grid side 20 and the material side 22. The result of this coating is a conversion of the lead chloride with the zinc to a porous lead plus zinc chloride. This zinc chloride will wash away when the battery is activated and exposed to seawater.

While the reduction mix preferred uses zinc as the metallic element metal powders of the group, iron, manganese, titanium, aluminum and magnesium may also be employed.

The amount of lead chloride which is desired to be reduced to metallic lead depends upon the electrical characteristics desired, such as activation time. Since this reduction subtracts from the coulombic capacity available in the electrode, the amount of reduction should be kept to the minimum necessary.

After converting the surface 22 to porous lead and zinc chloride the assembled strip is dried, and after drying the assembly is pressed and trimmed by cutters to define the desired rectangular plate configuration. The battery plates are then stored and are ready for installation in the battery assembly.

Figure 1:
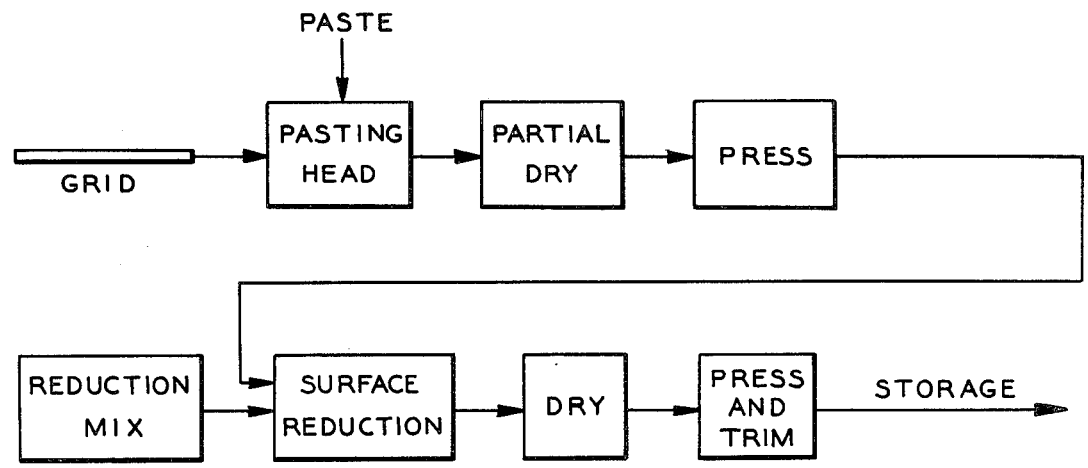
FIG. 1 is a schematic block diagram illustrating the various stages of manufacture of a battery plate in accord with the invention.

FIG. 1 illustrates, schematically, the various stages utilized in constructing a battery plate 10 in accord with the invention. The grid 12 may be fed from a roll into a pasting head at which the lead chloride paste mixture is applied to the grid and by means of a scraper, wiper or the like, not shown, a coincident relationship between the grid surface 18 and material surface 22 is attained. After the lead chloride paste has been applied to the grid it is partially dried, and after being partially dried, may be pressed by rollers. This pressing step is optional, but preferred, to increase the mechanical strength of the assembly, and also improves the density of the material 14. The next step is the reduction of the material surface 22. The surface reduction occurs by the applying of the zinc powder reduction mix in a very thin coat to the surfaces 20 and 22, and this mixture is stirred or otherwise agitated to retain the zinc in uniform suspension.

After reduction of the surface 22, the assembly is dried and is trimmed by shear blades. If desired, a further roll pressing of the assembly may take place prior to trimming, and the cut finished plates are then packaged and stored for future use.

It will be appreciated that the aforedescribed process is readily adaptable to high production techniques as the grid 12 and active material 14 are assembled and processed as a strip moving through the disclosed stations. The operations of the various stations may be fully automated and few operators are required in the production of battery plates in accord with the invention.

Thermoplastic acrylic polymer emulsion is the preferred binder for the active material, but other binders may be used such as styrene/butadiene/acrylonitrile resin, polyvinyl chloride resin, polyvinyl acetate resin or its copolymer with ethylene, and tetrafluoroethylene dispersion. These ingredients may be used in emulsion, dispersion or solution form. The battery plates formed in accord with the invention are used as the positive plates, or cathode, for the battery, and seawater battery cells utilizing these plates will obtain full voltage output in 15–60 seconds with seawater at 0° C., as compared to prior art cells requring 30–100 seconds to reach full operating voltage with cold seawater. This improved reduction in activation time is considered to be a result of the surface reduction of the material to produce the lead and zinc chloride surface 24 as it increases battery activation.

Further, seawater batteries constructed in accord with the aforedescribed invention produce little or no voltage peaking at the beginning of the discharge cycle and the voltage remains relatively constant during discharge until the battery life is depleted. The fact that a very fine mesh grid is not required reduces manufacturing costs, and battery plates in accord with the invention can be manufactured more economically than presently available seawater plates.

It is appreciated that various modifications to the inventive concepts may be apparent to those skilled in the art without departing from the spirit and scope of the invention.

We claim:

1. The method of forming a positive plate for a battery wherein the active material reduced during electrical energy generation is primarily lead chloride comprising the steps of:
  (a) forming a spreadable paste consisting of lead chloride powder mixed with a resinous organic binder in liquid form,
  (b) spreading said paste in a substantially uniform thickness upon an open mesh grid formed of an electrical conducting material in a manner whereby the grid remains adjacent a primary surface of the plate and is exposed at said primary plate surface,
  (c) applying a mixture consisting of water and a reducing metal powder selected from the group consisting of zinc, iron, manganese, titanium, aluminum and magnesium to the primary surface of the plate at which said grid is exposed to convert the lead chloride adjacent said grid to metallic lead,
  (d) and drying the plate after the conversion of said primary surface of lead chloride to metallic lead.

2. The method of forming a positive plate for a battery as in claim 1 including the additional step of compressing the plate in a direction transverse to the general configuration of the plate grid prior to applying the reducing mixture to the lead chloride and grid assembly.

3. The method of forming a positive plate for a battery as in claim 1 wherein said paste consists of approximately 97% by weight lead chloride powder and said binder consists approximately 3% by weight a thermoplastic acrylic polymer emulsion.

* * * * *